United States Patent
Norambuena Valdivia et al.

(10) Patent No.: US 11,487,253 B2
(45) Date of Patent: Nov. 1, 2022

(54) METHOD FOR SEQUENTIAL PREDICTIVE CONTROL, FIRST SOLVING A COST FUNCTION AND SUBSEQUENTLY A SECOND COST FUNCTION FOR TWO OR MORE CONTROL OBJECTIVES

(71) Applicant: UNIVERSIDAD ANDRES BELLO, Santiago (CL)

(72) Inventors: Margarita Norambuena Valdivia, Valparaiso (CL); Jose Rodriguez Perez, Vina del Mar (CL)

(73) Assignee: UNIVERSIDAD ANDRES BELLO, Santiago (CL)

( * ) Notice: Subject to any disclaimer, the term of this patent is extended or adjusted under 35 U.S.C. 154(b) by 290 days.

(21) Appl. No.: 16/647,150

(22) PCT Filed: Sep. 15, 2017

(86) PCT No.: PCT/CL2017/050052
§ 371 (c)(1),
(2) Date: Mar. 13, 2020

(87) PCT Pub. No.: WO2019/051621
PCT Pub. Date: Mar. 21, 2019

(65) Prior Publication Data
US 2021/0181697 A1 Jun. 17, 2021

(51) Int. Cl.
*G01R 31/367* (2019.01)
*G05B 13/04* (2006.01)
(Continued)

(52) U.S. Cl.
CPC ............ *G05B 13/048* (2013.01); *H02P 23/14* (2013.01); *H02P 27/06* (2013.01)

(58) Field of Classification Search
CPC ....... G05B 13/048; H02P 23/14; H02P 27/06; G01R 31/367; H02M 7/4837
See application file for complete search history.

(56) References Cited

U.S. PATENT DOCUMENTS

2014/0376287 A1 * 12/2014 Narimani ............ H02M 7/4837
363/60
2017/0133845 A1 5/2017 Geyer et al.
(Continued)

FOREIGN PATENT DOCUMENTS

CN 103762926 A 4/2014
CN 106059428 A 10/2016

OTHER PUBLICATIONS

Cisternas Godoy, Paulo Cesar; International Search Report and Written Opinion of the International Searching Authority, issued in International Application No. PCT/CL2017/050052; dated Jun. 13, 2018; 27 pages including English translations.
(Continued)

*Primary Examiner* — Cortez M Cook
(74) *Attorney, Agent, or Firm* — Ulmer & Berne LLP

(57) ABSTRACT

A sequential or cascading predictive control method is provided, including first solving a cost function and then a second cost function for two or more control objectives. The method includes
separating the cost function into at least two or more cost functions, depending on the number of defined control objectives.
The method additionally includes controlling a first variable with a unitary cost function, a single term or nature of the control objectives.
The method also includes determining the possible states that minimize the cost of the first objective to be controlled. Considering only the options given through this determination, a second variable is controlled with a cost function that minimizes the cost function thereof.

9 Claims, 4 Drawing Sheets

(51) Int. Cl.
*H02P 23/14* (2006.01)
*H02P 27/06* (2006.01)

(56) References Cited

U.S. PATENT DOCUMENTS

| | | |
|---|---|---|
| 2017/0133849 A1 | 5/2017 | Feng et al. |
| 2017/0139427 A1 | 5/2017 | Weiss et al. |
| 2017/0160760 A1 | 6/2017 | Blasko |
| 2017/0227937 A1* | 8/2017 | Batliner .............. G01R 31/367 |

OTHER PUBLICATIONS

Vazquez, S. et al.; Model Predictive Control for Power Converters and Drives: Advances and Trends; IEEE Transactions on Industrial Electronics, vol. 64, No. 2, Feb. 2017; 17 pages including abstract and publication information.

* cited by examiner

METHOD FOR SEQUENTIAL PREDICTIVE CONTROL, FIRST SOLVING A COST FUNCTION AND SUBSEQUENTLY A SECOND COST FUNCTION FOR TWO OR MORE CONTROL OBJECTIVES

APPLICATION FIELD

The present invention relates to the control of equipment or system processes, more specifically to a predictive control method, and more specifically a sequential or cascade predictive control method, first solving a cost function and then a second cost function for Two or more control objectives.

DESCRIPTION OF THE PRIOR ART

In our today society, electricity is a fundamental pillar in the various activities carried out day by day. The use and transport of electric energy is carried out using strategic equipment based on power semiconductors. A problem of interest today is the control of these equipment, called inverters/rectifiers.

Today there are two major control proposals, one of them is linear control, a technology that has been in the industry for more than 60 years, however, the equipment used today is not linear systems and requires the linearization of its equations to operate at a specific point of work. In addition, this control strategy requires a thorough study of control techniques to be able to implement such control.

The other major proposal that has begun to be implemented in recent years is the (MPC) model-based predictive control strategy, the great advantage of this strategy over linear control systems is its handling of nonlinear equations in a plain and simple way, without the need to resort to the linearization of system equations. However, one of the great shortcomings of this control strategy is its implementation, because at the time of wanting to control multiple variables it requires adjusting a weight or weighting factor, whose adjustment is not standardized and requires an empirical adjustment (test/error).

The control objectives of a system can have the following characteristics:
  Different physical nature (current, voltage, active/reactive power, conduction losses, torque, flow, etc., for example in electronics power applications).
  Show coupling between variables.
  Different importance between them for the desired control result.

These characteristics of the control objectives can be managed using weight factors or ranking tables, in order to obtain the desired behavior of the system. However, the adjustment of these weight factors is not normalized and will depend on the nature of the different terms involved, therefore, we can classify a cost function in different groups:
  1. Cost function without weight factor: in this case only variables of a single nature are controlled, for example, system currents, or system powers, or system voltages, etc. But only one of these variables at a time.
  2. Cost function with secondary terms: in this case there is a main objective of control and a secondary one clearly marked, such as system currents and switching frequency of power semiconductors. In this case, the variable of importance is the currents and the secondary term is the switching frequency.
  3. Cost function with equally important terms: in this case we cannot distinguish a term of bigger importance than the other, such as, for example, the control of torque and flow in an electric machine.

Depending on the type of cost function that is obtained, a certain process of adjusting the weight factors can be carried out, for example, for the case of group 1 it is not necessary to adjust any weight factor, but for case 2 the adjustment process is not direct and an empirical adjustment is necessary through simulation checking and observation of the effect of the same, but for case 3 the process of selection of weight factors is further complicated, because it is not possible to distinguish what is the variable that is producing the final resulting effect that can be seen in the simulations performed in order to try to adjust it.

In the state of the art we can find documents that describe standard predictive control, for example, documents US2017260760 (A1) of HAMILTON SUNDSTRAND CORP., Dated 8 Jun. 2017, entitled "Model predictive control optimization for power electronics"; US2017133849 (A1) of ABB SCHWEIZ AG, dated 11 May 2017, entitled "Hierachical robust model predictive voltage and var control with coordination and optimization of autonomous der voltage control"; US2017133845 (A1) of ABB SCHWEIZ AG, dated 11 May 2017, entitled "Model predictive control of a modular multilevel converter", describes a single cost function that may or may not control more than one control objective through a factor of weight that discriminates the importance between one and another control objective.

US2017139427 (A1) of MITSUBISHI ELECTRIC RES LABORATORIES INC, dated 18 May 2017, entitled "Model predictive control of spacecraft", describes a predictive control model for the position of the satellite/aircraft, this is not rectifier/inverter control, however, it shows the versatility of the MPC that can be applied to processes not only of an electrical/electronic nature in converters/inverters, in fact the MPC control arose in chemical processes.

The model-based predictive control (MPC for its acronym in English: Model Predictive Control), has as its most attractive feature its conceptual simplicity and its facility to incorporate multiple control objectives in the same control strategy, however, both points are opposed having to define a certain weight factor to discriminate between one and another control term.

As shown in FIG. 1 (prior art), the main steps of the basic control strategy used in the 4 patent documents previously named are:
  1. Find a mathematical model that predicts the operation of the system considering known actions. "Prediction Model" block.
  2. Based on the possible actions (finite number of options), the optimal performance is determined according to a single criterion, which is the evaluation of a cost function that may or may not have more than one control objective. MPC block: "Cost Function Minimization g1".
  3. The state that minimizes the cost function is applied to the converter or to the system to be controlled.

The difference of all these patent documents lies solely in the type of application, in the case of documents US2017260760 and US2017133845 is the type of converter, which changes the prediction model and the respective cost function. As for document US2017139427, the application is totally different from the other patent documents mentioned above, however, they respect the control diagram shown in FIG. 1 and appropriately changing the prediction model and the cost function in order to follow the error in the objectives of control of its interest, maintaining the same structure of the figure already explained previously.

However, the method that is proposed to be protected in the present application has a different predictive control application structure, without losing the ability to apply to the processes already described in the documents cited, that is, it is possible to replace the structure of FIG. 1 (prior art) by the sequential predictive control diagram of the present application (see FIG. 2) and obtain the specific solutions for the same applications of the prior art documents described, but separating the cost function into two or more, depending on the number of control objectives. In the case of FIG. 2 it is applied to an electric machine, in this case, the control objectives are Torque and Flow, therefore, predictive control is performed for one of these objectives and all those possible states are selected that minimize the error of this first variable, then a new iteration is carried out for the second control objective, seeking to minimize the error of this second variable, having as performance options only those that minimize the first variable as action options.

Therefore, a sequential predictive control is presented that does not require determining any weight factor without adding complexity to the system, thus maintaining both value characteristics, conceptual simplicity and simple incorporation of multiple control objectives.

DETAILED DESCRIPTION OF THE INVENTION

Figure 5:
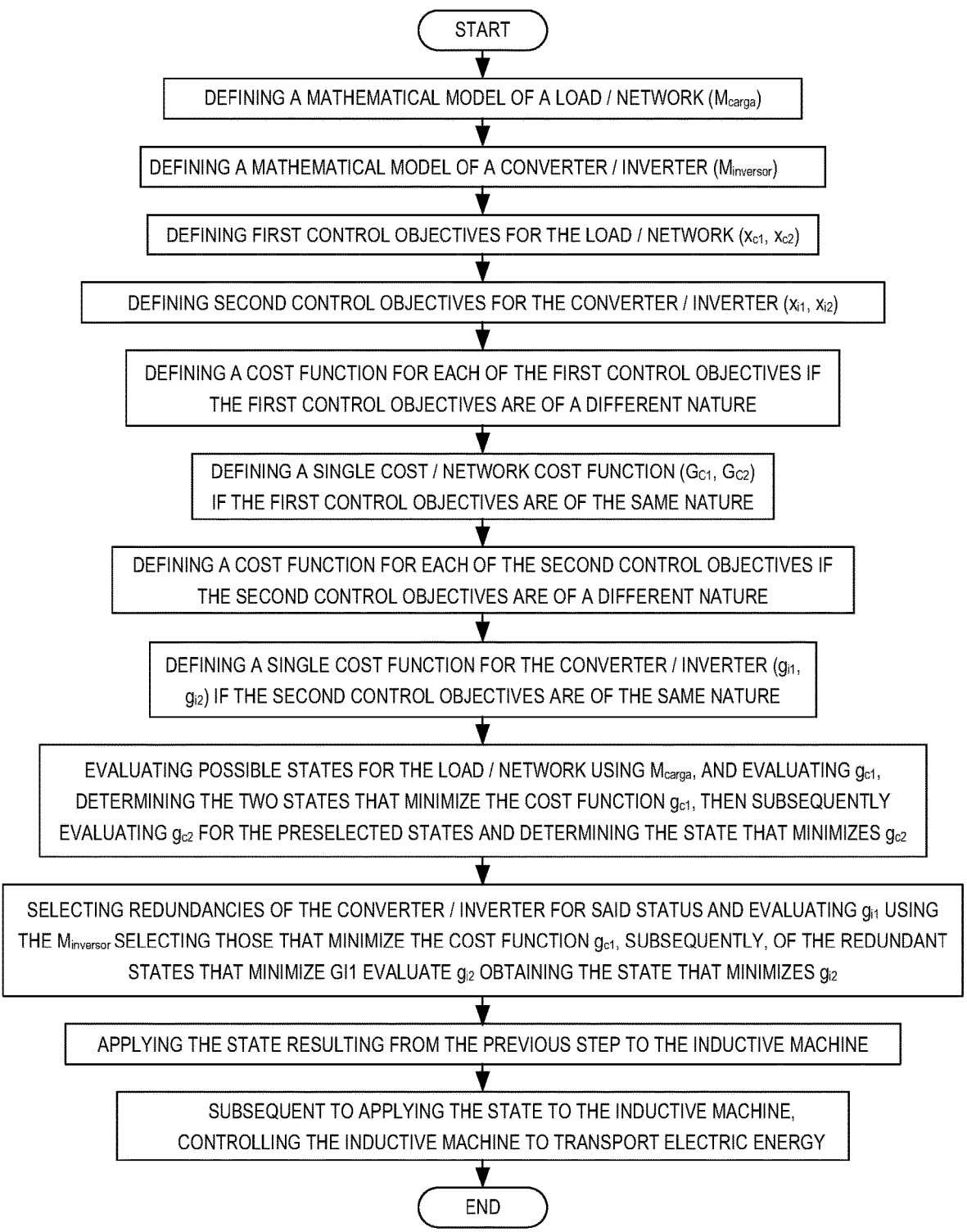
FIG. 5 shows a flow chart of the sequential predictive control for an induction machine.

The present invention provides a sequential or cascade predictive control method, first solving a cost function and then a second cost function for two or more control objectives (see FIG. 5), comprising:
a) separate the cost function into at least two or more cost functions, depending on the number of control objectives;
b) define control objectives;
c) first control a variable with a unit cost function, a single term or nature of the control objectives;
d) determine the possible states that minimize the cost of the first objective to be controlled; Y
e) control a second variable with a cost function that minimizes its cost function considering only the options given in the point d).

On the other hand, for an application that involves power electronics, specifically for inverter/rectifier applications, the method is defined as follows:
1. Define the mathematical model of the load/network ($M_{carga}$).
2. Define the mathematical model of the converter/inverter ($M_{inversor}$)
3. Define the control objectives for the load/network ($x_{c1}$, $x_{c2}$)
4. Define the control objectives for the inverter converter ($x_{i1}$, $x_{i2}$)
5. If the objectives of load control are of a different nature (voltage, current, power, harmonics) define a cost function for each of them. If they are of the same nature (only currents, only voltages, only powers, etc.) define a single cost function for the load/network ($g_{c1}$, $g_{c2}$)
6. If the control objectives of the converter/inverter are of a different nature (voltage, current, switching frequency, losses) define a cost function for each of them. If they are of the same nature (only currents, only voltages, only losses, etc.) define a single cost function for the converter/inverter ($g_{i1}$, $g_{i2}$)
7. Using Mcarga, evaluate the possible states for the load/network and evaluate $g_{c1}$ determining the two states that minimize the cost function $g_{c1}$ then evaluate $g_{c2}$ for the preselected states and determine the state that minimizes $g_{c2}$.
8. With the resulting state, select the redundancies of the existing converter/inverter for said state and evaluate $g_{i1}$ using the $M_{inversor}$ by selecting those that minimize the cost function $g_{c1}$, subsequently, of the redundant states that minimize $g_{i1}$ evaluate $g_{i2}$ obtaining the state that minimizes $g_{i2}$.
9. Apply resulting state from the previous step.

Application Example

Figure 1:
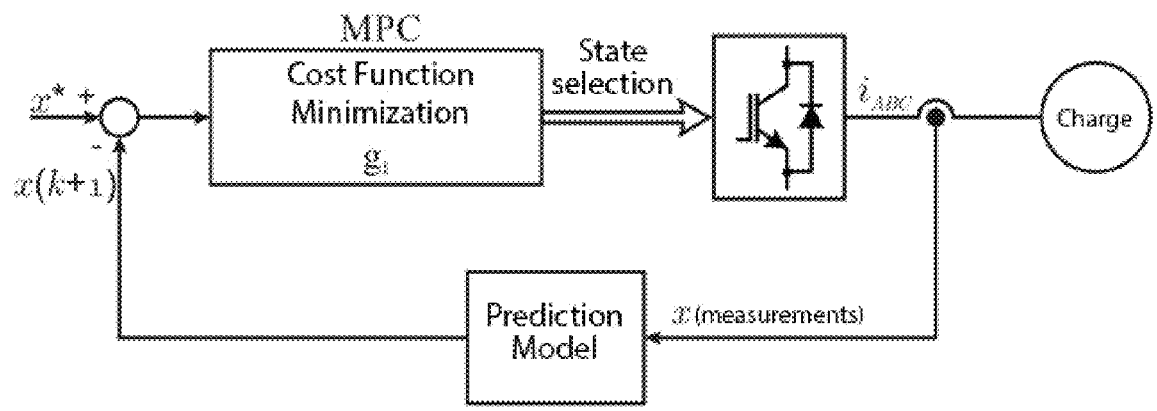
FIG. 1 (Prior Art) shows a standard predictive control scheme.
Figure 2:
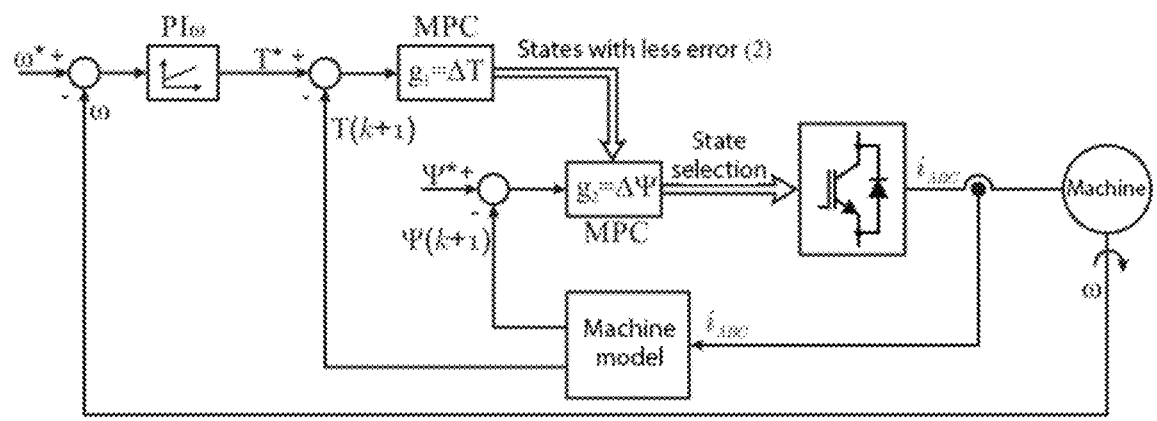
FIG. 2 shows a block diagram of the sequential predictive control of the present invention for an induction machine.

The present invention provides a method of sequential predictive control as shown in FIG. 2, where the application is for an induction machine consisting of first controlling a variable with a unitary cost function (a single term or control objective) and then the following terms. In this case of the control of an electric machine, the first variable to be controlled is the Torque, whose reference value is given, in this case, by the linear control of the angular speed of the machine. The two possible driving states of the converter that minimize the Torque are determined and then the predictive control of the Flow is carried out, which minimizes its cost function considering only the two options delivered by the Torque control process. The state that minimizes the error in the Stator Electric Flow is the one applied in the system.

Figure 3:
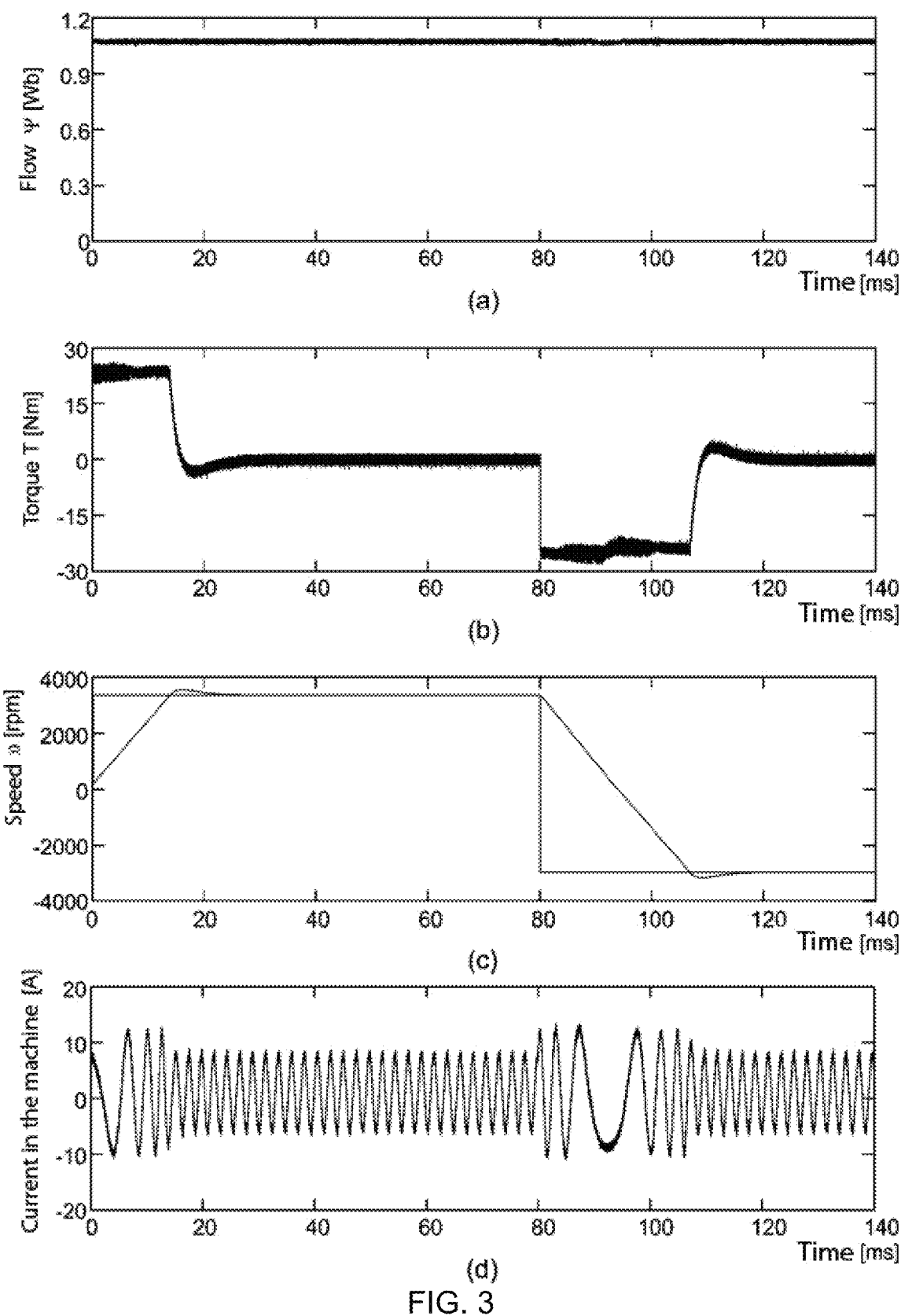
FIG. 3 shows graphs of different parameters of the sequential predictive control of the present invention for an induction machine, where (a) Flow; (b) Torque; (c) Angular velocity; (d) Current in phase a of the machine.
Figure 4:
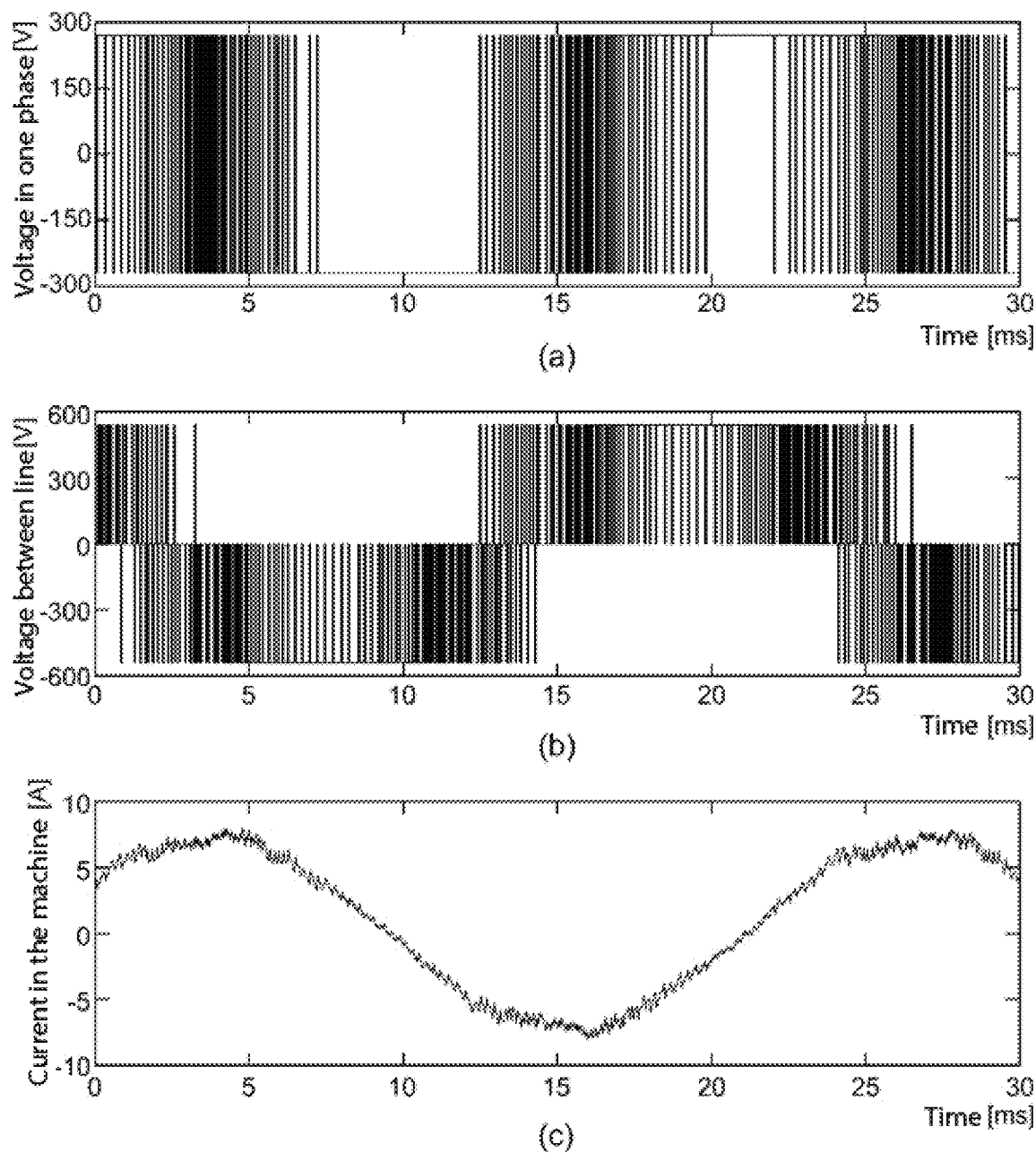
FIG. 4 shows graphs of different parameters of the sequential predictive control of the present invention for an induction machine, where (a) Voltage of a phase a (υaN); (b) Tension between lines (υab); (c) Current in phase a of the machine.

Using the method of sequential predictive control of the present invention, the control of the induction machine was performed, which presents control objectives where the cost function contains equally important terms, in this case a term of greater importance cannot be distinguished than the other, the most complex control when defining the weight factor. The results of the simulation of the control performed are shown in FIG. 3 and FIG. 4.

The equations that describe the system for modeling the torque and electrical flow of the machine stator are given by:

$$\psi_r^{k+1} = \frac{L_r}{L_m}\psi_s^{k+1} - \frac{1}{\lambda L_m}i_s^{k+1}$$

$$T_e^{k+1} = \frac{3}{2}N_p\psi_s^{k+1} \otimes i_s^{k+1}$$

Where Lr is the rotor inductance, Lm is the mutual rotor-stator inductance and λ is a factor given by the resistances, inductances and permeability of the machine, Np is the number of pole pairs of the machine, all known as machine parameters, and the superscript k+1 indicates that it is the estimated value at the next instant of the sampling time k.

The cost functions $g_1$ and $g_2$ are determined by:

$$g_1 = (T_m - T_r)^2$$

$$g_2 = (\varphi_m - \varphi_r)^2$$

Where the subscript m indicates that the variable is measured and the subscript r is the reference value.

It should be noted that this sequential predictive control SMPC (Sequential Model Predictive Control), can be used to control any system, regardless of its nature, as long as there are equations that model the behavior of the system and that allow predicting it, in the case of electrical systems, all of them can be controlled without problems by the SMPC, even those with terms of equal importance in the control objectives, such as the case of the induction machine.

The invention claimed is:

1. A sequential or cascading predictive control method for converters/inverters first solving a cost function and then a second cost function for two or more control objectives, wherein the converter / inverter is an induction machine, wherein the method comprises:
   a. defining a mathematical model of a load/network ($M_{carga}$);
   b. defining a mathematical model of a converter/inverter ($M_{inversor}$);
   c. defining first control objectives for the load/network ($x_{c1}$, $x_{c2}$);
   d. defining second control objectives for the converter/inverter ($x_{i1}$, $x_{i2}$);
   e. defining a cost function for each of the first control objectives if the first control objectives are of a different nature;
   f. defining a single cost/network cost function ($G_{c1}$, $G_{c2}$) if the first control objectives are of the same nature;
   g. defining a cost function for each of the second control objectives if the second control objectives are of a different nature;
   h. defining a single cost function for the converter/inverter ($g_{i1}$, $g_{i2}$) if the second control objectives are of the same nature;
   i. evaluating possible states for the load/network using Mcarga, and evaluating $g_{c1}$, determining the two states that minimize the cost function $g_{c1}$, then subsequently evaluating $g_{c2}$ for the preselected states and determining the state that minimizes $g_{c2}$;
   j. selecting redundancies of the converter/inverter for said status and evaluating $g_{i1}$ using the Minversor selecting those that minimize the cost function $g_{c1}$, subsequently, of the redundant states that minimize $g_{i1}$ evaluate $g_{i2}$ obtaining the state that minimizes $g_{i2}$;
   k. applying the state resulting from the previous step to the inductive machine; and
   l. subsequent to applying the state to the inductive machine, controlling the inductive machine to transport electric energy.

2. The method according to claim 1 wherein one of the first and second control objectives is Torque.

3. The method according to claim 1 wherein one of the first and second control objectives is Flow.

4. The method according to claim 2 wherein the mathematical model of the Torque is:

$$T_e^{k+1} = \frac{3}{2} N_p \psi_s^{k+1} \otimes i_s^{k+1}$$

wherein $N_p$ is the number of pole pairs of the machine, and the superscript k+1 indicates that it is the estimated value at the next instant of the sampling time k.

5. The method according to claim 3 wherein the mathematical model of the Flow is:

$$\psi_r^{k+1} = \frac{L_r}{L_m} \psi_s^{k+1} - \frac{1}{\lambda L_m} i_s^{k+1}$$

wherein $L_r$ is the rotor inductance, $L_m$ is the rotor-stator mutual inductance and $\lambda$ is a factor given by the resistance, inductance and permeability of the machine, all known as machine parameters.

6. The method according to claim 5, wherein cost function $g_1$ is determined by:

$$g_1 = (T_m - T_r)^2$$

wherein the subscript m indicates that the variable is measured and the subscript r is the reference value.

7. The method according to claim 1, wherein a first variable to be controlled is Torque, whose reference value is given in this case by linear control of angular velocity of the machine, and the method further comprises:
   determining two possible driving states of the converter/inverter that minimize the Torque; and
   proceeding with the predictive control of Flow, which minimizes the cost function thereof considering only the two options delivered by the Torque control process and where the state that minimizes the error in the electric flow of a stator is the one that is applied in the system.

8. The method according to claim 1 wherein the converter / inverter is a three phase machine.

9. The method according to claim 6, wherein cost function $g_2$ is determined by:

$$g_2 = (\varphi_m - \varphi_r)^2$$

wherein the subscript m indicates that the variable is measured and the subscript r is the reference value.

* * * * *